UNITED STATES PATENT OFFICE.

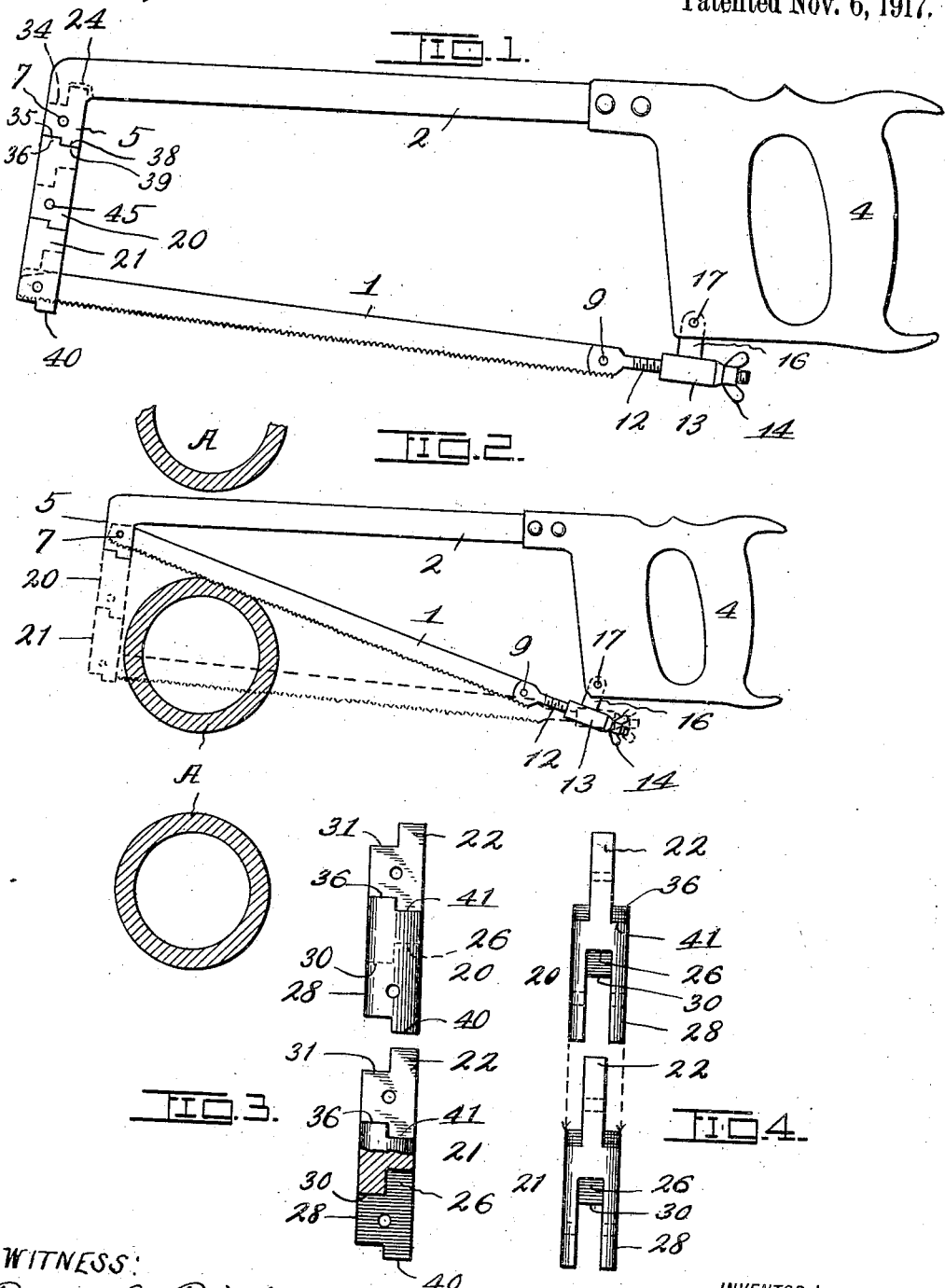

JOHN B. HOWELL, OF LEAVENWORTH, KANSAS.

HACKSAW.

1,245,345.  Specification of Letters Patent.  Patented Nov. 6, 1917.

Application filed July 9, 1917. Serial No. 179,367.

*To all whom it may concern:*

Be it known that I, JOHN B. HOWELL, a citizen of the United States, residing at Leavenworth, in the county of Leavenworth and State of Kansas, have invented certain new and useful Improvements in Hacksaws, of which the following is a specification.

My invention relates to improvements in hack saws for plumbers and other mechanics, and the principal object of the invention is to provide a saw of this character whereby pipes, rods, etc., difficult of access can be readily sawed in two.

A further object is to provide a saw of this character in which the blade may be adjusted away from the back of the saw, so that pipes and rods of large diameter may be readily sawed in two without coming into contact with said back. Other objects of the invention will hereinafter appear, and in order that said invention may be readily understood, reference will now be made to the accompanying drawing, in which:

Figure 1 is a side elevation of the saw showing the blade thereof adjusted away from the back.

Fig. 2 is a side elevation of the saw reduced, showing it in operative position with the forward end of the blade adjusted close to the saw back in full lines and adjusted away from said back in dotted lines.

Fig. 3 is a broken, side elevation, partly in section, of two extensible members constituting important features of the invention.

Fig. 4 is a front elevation of the parts disclosed by Fig. 3.

A, designates three pipes of a radiator, the intermediate one of which is being sawed in two, adjustment of the saw blade 1, being shown in dotted lines, to prevent the saw back 2 from striking said intermediate pipe as the sawing operation progresses. The saw back 2 is secured at its rear end to a handle 4 and has a forward, downturned, bifurcated terminal 5, to receive the forward end of the blade 1, which is removably-secured therein by a screw 7. The rear end of the blade 1 is removably-secured to a pin 9, projecting laterally from the forward end of a screw 12, extending loosely through a sleeve 13 and provided at its rear end with a thumb nut 14, whereby it may be taken up for the purpose of tensioning the blade 1. The sleeve 13 is provided with a lug 16, secured by a pivot 17 to the lower front portion of the handle 4. By thus pivotally-connecting the lug 17 to the handle 4, the sleeve 13 and the screw 12 are free to swing on the axis provided by said pin 17 and thus permit the saw to be adjusted to the full and dotted line positions disclosed by Fig. 2.

20 and 21 designate a pair of extensible members for adjusting the forward end of the blade 1 away from the saw back 2, as disclosed by dotted lines, Fig. 2. Each extensible member is provided at its upper end with a stop 22, the stop on the upper member 20 being adapted to fit into a corresponding recess 24 in the saw back terminal 5, while the stop 22 at the upper end of the member 21 is adapted to fit into a recess 26 in the bifurcated, lower portion 28 of the member 20. The upper member 20 is provided at its lower bifurcated portion 28 with an internal shoulder 30, adapted to abut the stop 22 on the member 21 and fit into a corresponding recess 31 in the upper portion of said member 21. The downturned, bifurcated terminal 5 on the saw back 2, has an internal shoulder 34, to enter a corresponding recess 31 in the upper end of the member 20. Said downturned end 5 also has two oppositely disposed recesses 35 to receive a pair of corresponding shoulders 36 on the member 20. The lower terminal 5 of said saw back has a pair of oppositely-disposed shoulders 38, to fit into corresponding recesses 39 in the upper portion of the member 20, which is likewise provided at its lower end with a pair of shoulders 40 to enter recesses 41 in the member 21.

The lower member 21 is a duplicate of the member 20, as indicated by like reference numerals on corresponding parts, to receive a third member of like construction, it being understood that any number of duplicate extensible members may be employed for adjusting the blade 1 away from the saw back 2, so that pipes and other articles of large diameter can be sawed in two without said back coming into contact with such articles. With the stops and shoulders of the extensible members fitting into each other, as above described, it is obvious that a rigid extension is provided from the forward end of the back 2 down to the forward end of the blade 1, especially when the joints are connected by screws 45 provided for that purpose.

In starting to cut a pipe in a place difficult of access, such as the intermediate pipe disclosed by Fig. 2, the forward end of the saw blade 1 is first secured in the downturned, bifurcated end of the saw back 2, so that the forward end of the saw may be inserted between the pipe to be severed and one of the adjoining pipes. After the sawing operation has progressed through the intermediate pipe until the back 2 almost contacts said pipe, an extensible member is interposed between the back of the saw blade to adjust the latter farther from said back. The sawing operation is then resumed, and if another member is necessary it can be added to the first member and so on, until the saw blade 1 is free to pass through the pipe without the back 2 contacting said pipe.

From the foregoing description, it is apparent that I have produced a saw embodying the advantages above enumerated, and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. In a saw of the character described, a handle, a back projecting forwardly therefrom, means at the forward end of said back and the lower portion of the handle for holding a saw blade, and extension members having interlocking shoulders and adapted to be interposed between the forward ends of the back and the saw blade to space the latter from said back.

2. In a saw of the character described, a handle, a back projecting forwardly therefrom, and provided with a downturned bifurcated terminal having shoulders and recesses, and an extension member adapted to be removably-secured to the saw blade and the bifurcated downturned terminal of the back, provided with a recess and shoulder to coact with those on said downturned terminal.

In testimony whereof I affix my signature, in the presence of two witnesses.

JOHN B. HOWELL.

Witnesses:
BRUTUS FRICHOT,
A. J. ERMAN.

Copies of this patent may be obtained for five cents each, by addressing the "Commissioner of Patents, Washington, D. C."